United States Patent Office 2,699,996
Patented Jan. 18, 1955

2,699,996

PROCESS FOR PREPARING A DRIED EGG OR CITRUS JUICE PRODUCT

Earl O. Sargent, Oxnard, Calif.

No Drawing. Application April 30, 1951,
Serial No. 223,829

6 Claims. (Cl. 99—199)

This invention relates generally to dried foods and in particular to a process for preparing eggs or citrus juices in a dried product form.

Eggs in a dried form have been used for many years and citrus juices in a dried form are believed to be uncommon although synthetic or substitute juices in a dried form for cold drink purposes are well known. Many users, particularly the personnel of the Armed Forces, are dissatisfied with presently available commercial dried eggs due to the spoiled or musty taste of such eggs. This unfavorable taste is probably due to the fact that in present methods of preparing dried eggs the drying of fresh eggs generally takes place at room temperatures with a resultant growth of undesirable bacteria and consequent partial fermentation.

It is an object of this invention, therefore, to provide an improved process for preparing eggs or citrus juices in a dried form.

A further object of this invention is to provide a process for drying eggs such that the dried eggs have substantially the flavor and taste of fresh eggs.

Still another object of this invention is to provide a process for drying citrus juices such that the resultant product is in a dried powdered form.

Further objects, features and advantages of this invention will appear from the following description.

In the practice of this invention, broken eggs have been thoroughly mixed with cool water in equal parts, and the resultant mixture chilled to a temperature of less than 40° F. The chilled mixture was then immediately taken to a dryer for removal of the excess moisture. The mixture, progressively with a decrease in the chilling temperature, was found to more readily form a dried product, namely, the individual particles were more free of any tendency to stick or adhere to each other.

With the ratio of the mix changed to four parts of fresh eggs to two parts of water by volume, the resultant mixture, on being chilled to a temperature of less than 40° F. and then dried, produced a product with substantially the same characteristics as the product made with 1:1 ratio mixture. However, with the 4:2 ratio a shorter drying period was required to remove excess moisture from the mixture.

Also, with the ratio of the mix changed to two parts of fresh eggs to four parts of water by volume, the resultant mixture, when chilled to a temperature of less than 40° F., and then dried, was found to require a little longer drying period than the 1:1 ratio mix. However, the resultant product again had substantially the same characteristics as the product formed with the 1:1 ratio mix.

The practice of this invention in connection with citrus juices was found to be substantially similar to its practice relative to fresh eggs. Relative to both the dried egg product and the dried citrus juice product, the resultant product was readily formed into particles or a powder, with little or no adhesiveness or tackiness between the particles. In other words, the fresh eggs and the citrus juices appear to undergo a similar chemical reaction, when mixed with water and then chilled that prevents any return to their original form, and in particular the chemical characteristic of adhesiveness or stickiness in these materials is substantially removed.

Further, it appears that the chilling of a mixture of water and fresh eggs or citrus juice to a temperature of less than 40° F. has more to do with the chemical reaction in these materials to remove the sticky or adhesive characteristics therein, than the particular ratio of mix of these materials with water.

In carrying out the method of this invention atmospheric drying, vaccum drying or spray drying may be used with equally satisfactory results. The drying temperature should always be below a temperature which would coke or burn the mixture, since any coking or burning would impair the taste and flavor of the resultant products. At the beginning of the drying operation, a relatively high temperature of about 350° F. may be used, but as the drying operation approaches completion the heating temperature can be reduced to about 150° F.

Although the invention has been described with respect to a preferred method for the manufacture of eggs or citrus juices in a dried form, it is to be understood that it is not to be so limited, since changes can be made therein which are within the full intended scope of this invention as defined by the appended claims.

I claim:

1. The process for preparing in a dried form a food material of the group consisting of liquid eggs and citrus juices, which consists in mixing water with said food material, chilling the resultant mixture to a temperature of less than 40° F., whereby, with a progressive decrease in the chilling temperature there is a decreased tendency for the individual particles in the final dried product to adhere to each other, and then subjecting the chilled mixture to a drying operation of the group consisting of atmospheric drying and spray drying to remove excess moisture therefrom.

2. The process for preparing a dried egg product which consists in mixing fresh broken eggs with water, chilling the resultant mixture to a temperature of less than 40° F., whereby, with a progressive decrease in the chilling temperature there is a decreased tendency for the individual particles in the final dried product to adhere to each other, and then spray drying the chilled mixture to remove excess moisture therefrom.

3. The process for preparing a dried egg product which consists in mixing cool water with fresh broken eggs within a range of 2:1 either way, by volume, chilling the resultant mixture to a temperature of less than 40° F., whereby, with a progressive decrease in the chilling temperature there is a decreased tendency for the individual particles in the final dried product to adhere to each other, and then spray drying the chilled mixture to remove excess moisture therefrom.

4. The process for preparing a dried egg product which consists in mixing cool water with fresh broken eggs, in substantially equal amounts by volume, immediately chilling the resultant mixture to a temperature of less than 40° F., whereby, with a progressive decrease in the chilling temperature there is a decreased tendency for the individual particles in the final dried product to adhere to each other, and then spray drying the chilled mixture to remove excess moisture therefrom.

5. The process for preparing a dried citrus juice product which consists in mixing citrus juice with water, chilling the resultant mixture to a temperature of less than 40° F., whereby, with a progressive decrease in the chilling temperature there is a decreased tendency for the individual particles in the final dried product to adhere to each other, and then spray drying the chilled mixture to remove excess moisture therefrom.

6. The process for preparing a dried citrus juice product which consists in mixing citrus juice with water, within a range of 2:1 either way, by volume, chilling the resultant mixture to a temperature of less than 40° F., whereby, with a progressive decrease in the chilling temperature there is a decreased tendency for the individual particles in the final dried product to adhere to each other, and then spray drying the chilled mixture to remove excess moisture therefrom.

References Cited in the file of this patent

UNITED STATES PATENTS

| Number | Name | Date |
|---|---|---|
| 1,630,756 | Parsons | May 31, 1927 |
| 1,891,887 | Clickner | Dec. 20, 1932 |
| 2,140,788 | Cowgill | Dec. 20, 1938 |
| 2,278,472 | Musher | Apr. 7, 1942 |
| 2,555,466 | Bogin et al. | June 5, 1951 |